(12) United States Patent
McWeeney

(10) Patent No.: US 9,875,314 B2
(45) Date of Patent: Jan. 23, 2018

(54) CONTENT REQUEST WITH HTTP REQUEST-HEADER RENDERING TEMPLATE THAT IS INDEPENDENT OF CONTENT STORAGE LOCATION

(71) Applicant: Adobe Systems Incorporated, San Jose, CA (US)

(72) Inventor: Daniel W. McWeeney, New York, NY (US)

(73) Assignee: ADOBE Systems Incorporated, San Jose, CA (US)

( * ) Notice: Subject to any disclaimer, the term of this patent is extended or adjusted under 35 U.S.C. 154(b) by 1170 days.

(21) Appl. No.: 13/874,020

(22) Filed: Apr. 30, 2013

(65) Prior Publication Data
US 2014/0325337 A1   Oct. 30, 2014

(51) Int. Cl.
| G06F 17/00 | (2006.01) |
| G06F 17/22 | (2006.01) |
| G06F 17/30 | (2006.01) |
| H04L 29/08 | (2006.01) |

(52) U.S. Cl.
CPC ........ *G06F 17/30893* (2013.01); *H04L 67/02* (2013.01)

(58) Field of Classification Search
CPC .................... G06F 17/30902; G06F 17/30893
See application file for complete search history.

(56) References Cited

U.S. PATENT DOCUMENTS

| 7,360,025 | B1 * | 4/2008 | O'Connell | ........ G06F 17/30902 707/999.201 |
| 7,921,353 | B1 | 4/2011 | Murray | |
| 8,056,075 | B2 | 11/2011 | Balassanian | |
| 8,478,843 | B1 * | 7/2013 | Ortlieb | .................. H04L 67/289 709/203 |
| 9,342,508 | B2 * | 5/2016 | Bassett | ................ G06F 9/4448 |
| 2003/0145305 | A1 * | 7/2003 | Ruggier | .................... G06F 8/38 717/100 |

(Continued)

OTHER PUBLICATIONS

Fielding, et al., 14 Header Field Definitions, part of Hypertext Transfer Protocol—HTTP/1.1, Jun. 1999, 39 pages.

(Continued)

*Primary Examiner* — Ariel Mercado Vargas
(74) *Attorney, Agent, or Firm* — Finch & Maloney PLLC

(57) ABSTRACT

Techniques are disclosed for managing page state and interaction between a client and server. One embodiment provides a server that is configured to serve webpages having code therein that is executable within the client browser. The code is invoked upon user input indicative of a content request and is configured to request the server to pass back a desired representation of the requested content based on a template specified in the HTTP Accept request-header. The template is independent of content storage location, thereby allowing the same resource at a given server storage location to be accessed and presented in numerous renditions. The server is configured to send back the requested content in a rendition that corresponds to the specified template. The client-based code can be further configured to place the returned content the appropriate page location. The HTTP Accept request-header may specify a media type and template combination.

20 Claims, 5 Drawing Sheets

(56) References Cited

U.S. PATENT DOCUMENTS

| | | | | |
|---|---|---|---|---|
| 2008/0155110 | A1* | 6/2008 | Morris | H04L 61/301 709/230 |
| 2012/0150993 | A1* | 6/2012 | Flack | H04L 67/2819 709/217 |
| 2014/0223334 | A1* | 8/2014 | Jensen | G06Q 10/101 715/753 |
| 2014/0289640 | A1* | 9/2014 | Poornachandran | G06F 17/212 715/745 |

OTHER PUBLICATIONS

Danwebnet—RJS Minus R, downloaded from URL: http://danwebb.net/2006/11/17/rjs-minus-r/, posted Nov. 2006, 13 pages.

Fielding, Roy Thomas, "Architectural Styles and the Design of Network-based Software Architectures," Dissertation—University of California at Irvine, 2000, 180 pages.

Communicate with a Server, downloaded from URL: https://developers.google.com/web-toolkit/doc/latest/DevGuideServerCommunication, last updated Oct. 25, 2012, 21 pages.

Fielding, et al., Hypertext Transfer Protocol—HTTP/1.1, Jun. 1999, 165 pages.

Hertel, Matthias, "Aspects of AJAX," Version 1.2, May 2007, 142 pages.

Driessche, Fred van den, "SWAN a Web Application Framework for STAGE," Final Report, Imperial College, Oct. 12, 2010, 80 pages.

73 Complex Forms Part 1, downloaded from URL: http://railscasts.com/episodes/73-complex-forms-part-1, 3 pages (Oct. 1, 2007).

74 Complex Forms Part 2, downloaded from URL: http://railscasts.com/episodes/74-complex-forms-part-2, 2 pages (Oct. 8, 2007).

75 Complex Forms Part 3, downloaded from URL: http://railscasts.com/episodes/75-complex-forms-part-3, 5 pages (Oct. 15, 2007).

205 Unobtrusive Javascript, downloaded from URL: http://railscasts.com/episodes/205-unobtrusive-javascript, 3 pages (Mar. 15, 2010).

Tornado Documentation, Release 3.2.2, downloaded from URL: https://media.readthedocs.org/pdf/tornado/branch3.2/tornado.pdf, 147 pages (Jul. 21, 2015).

SLING-2533 ResourceCollector fails to resolve selector scripts when no extension is used, downloaded from URL: https://issues.apache.org/jira/browse/SLING-2533, 2 pages (Jul. 17, 2012).

* cited by examiner

CONTENT REQUEST WITH HTTP REQUEST-HEADER RENDERING TEMPLATE THAT IS INDEPENDENT OF CONTENT STORAGE LOCATION

FIELD OF THE DISCLOSURE

This disclosure relates to computer network-based communications, and more particularly, to techniques for managing page state and interaction between a client and server.

BACKGROUND

The client-server architecture is a common approach to networking and communications between computer systems. Numerous applications and functions, such as cloud-based document repositories and services, email, and Internet-based communications all can be implemented using client-server architecture. In general, a client can be any computer (e.g., desktop, laptop, tablet, smartphone, etc) or computer program that queries a server to make use of a resource, and a server is a computer system configured to share its resources with requesting clients. Example resources that can be shared between a server and client are numerous and virtually unlimited, including data (e.g., information databases and blogs), data storage systems (e.g., repositories for storing and organizing client files and data), and processing capability (e.g., central processing unit and/or graphics processing unit), to name a few. Client and server computing systems typically communicate with one another in a request-response protocol, where the client sends a request and the server returns a response to that request.

As is further known, a browser is a client-side application commonly used to initiate client requests to a server, wherein a desired resource of the server is identified by a Uniform Resource Identifier (URI) and may be, for example, a webpage, image, video or other consumable content. As is further known, a uniform resource locator (URL) is a type of URI that defines the network storage location of a specific representation for a given resource, and also defines the file extension that indicates what content type is available at the URL. Although browsers are primarily used for Internet-based communications, they can also be used to access file systems as well as information provided by servers in private networks. As is further known, HyperText Markup Language (HTML) is the main markup language for creating pages and other information that can be displayed in a browser, and HTML elements are the building blocks of most websites. HTML allows objects and content to be embedded and can be used to create interactive forms, and provides a mechanism for creating documents by specifying structural semantics for text such as headings, paragraphs, links, and other items. HTML can also embed scripts (e.g., such as JavaScript-based code) which affect the behavior of a given HTML page at the client.

DETAILED DESCRIPTION

Figure 1A:
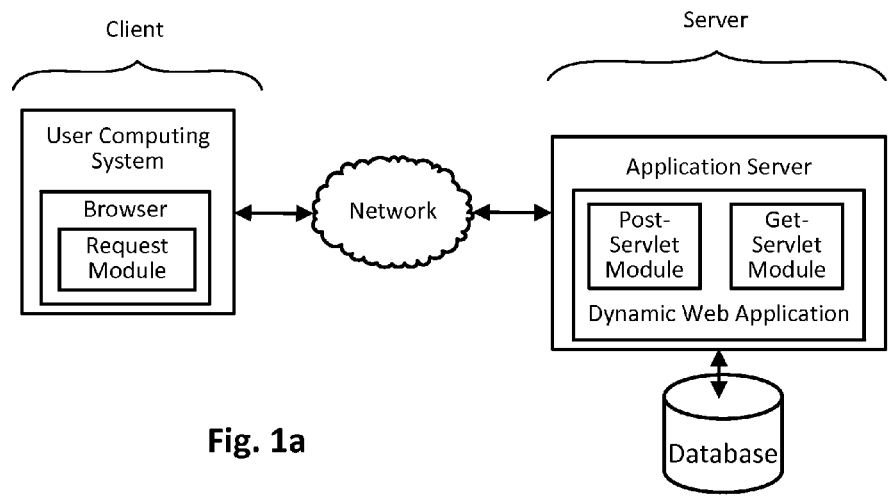
FIG. 1a illustrates a client-server system configured in accordance with an embodiment of the present invention.

Techniques are disclosed for managing page state and interaction between a client and server. One embodiment provides a server that is configured to serve webpages having code embedded therein that is executable within the client browser. The embedded code is invoked upon user input indicative of a content request for content managed by and stored at the server, such as a click on a hyperlink or a submit button. The embedded code is configured to request the server to pass back a desired representation of the requested content based on a template specified in the HTTP Accept request-header. The template is independent of the storage location of the content (i.e., it is not embedded within a URL or otherwise tied to a specific storage location on the server). Thus, the same resource at a given storage location on the server can be accessed and presented in numerous renditions depending on the template indicated in the HTTP Accept request-header associated with a given request. In response, the server is configured to send back the specifically requested content and in a rendition that corresponds to the specified template. The client-based code provided in the corresponding webpage can be further configured to manage the server's response including placement of the provided content within the page at the appropriate location. If the specified template is not available at the server, a default rendition of the content may be provided. The HTTP Accept request-header may further specify a media type, so as to provide a media type and template combination with which the requested content can be rendered. The varying of the Accept request-header (including the template for rendering the response) applies to all the HTTP verbs, such as Post and Get requests.

For purposes of clarity, and as will be appreciated in light of this disclosure, a template is normally embedded within a URL and thus tied to a specific storage location on the server. To this end, conventional template-usage implicates multiple storage locations for a given resource (and consequently, multiple copies of that resource—one copy for each URL). In contrast and in accordance with an embodiment of the present invention, the same resource at a given storage location on the server can be accessed each time (using the same URL) and rendered according to any desired template specified in the Accept request-header and that is available at the server when the request is received and processed. Likewise, the format of the rendered content can be any desired media type (e.g., HTML or JSON), which can also be specified in the Accept request-header. Thus, the client need not create any media type; rather, the client only modifies the page using the desired media type generated by the server and returned in the response to the content request.

General Overview

Managing webpage state and interaction between a client and server is generally a difficult problem for website developers. One common approach is to use Ruby to generate JavaScript code, which is in turn sent by server in response to a client request. With such an approach, Ruby code effectively renders instructions and the resulting JavaScript renders the page data. A common goal for website developers is for the given website to be easily crawlable by search engines, and to load quickly but also feature a rich and appropriate client-side interface. For example, a given website should update a client-side webpage when new data becomes available on the server, or make changes to the webpage when the user has entered some error state. As a given application becomes increasingly more complex it becomes increasingly more difficult to manage changes to the site or the addition of new features. To this end, there are a number of non-trivial issues that can arise. For example, when making changes to a given website or adding new features, most web frameworks configure the server to generate more and more client-side code from some language other than HTML (e.g., using Ruby code to generate JavaScript), so as to assist in managing the page. By way of example, consider a website configured to allow users to post comments on a given topic, such as a blog website or a social networking website. In response to a request from the user's computer (client), the server hosting the website serves a page that includes an HTML form with a text box and a submit button. When the user makes an entry into the text box and submits the form (via a browser running on the user's computer), the page will refresh. Further assume that the website developer wants to insert the user-posted comment into the current page without a refresh of the complete page. One approach to accomplish such a partial page update is to have the server generate JavaScript code (via Ruby code) which can then be executed by the client's browser to modify the page, but such an approach can be hard to debug (given the Ruby to JavaScript conversion, for instance). In other solutions, the server responds with some JavaScript object notation (JSON) data that is converted into HTML via client-side JavaScript code, which can cause differences in representation or at least duplication of effort (for instance, the server uses one process such as JavaServer Pages (JSP) and the client uses another such as mustache templates). The JSON format is commonly used to transmit data between a server and web application (such as the client-side browser), and is often used for serializing and transmitting structured data over a network connection. In many such cases, the server will respond to certain URLs with either the Ruby-generated JavaScript or whatever the corresponding client-side solution is, but these URLs are usually hardcoded into the server. In more detail, a common practice is for different representations to be available at different URLs (for instance, /path/to/some/resource.json or /path/to/some/resource.html or /path/to/some/resource.js). These paths are generally defined or otherwise hardcoded on the server and are usually tightly coupled to the given framework. For example, Ruby on Rails (generally shortened to Rails, and which is an open source web application framework for the Ruby programming language) employs a JavaScript resource to represent server-side generated-JavaScript that can be executed by the client. As such, the number of available representations is limited to the given server-side hardcode. Further increasing the complexity is that the principles defined in the Representational State Transfer (REST) design model should be honored.

Thus, and in accordance with an embodiment of the present invention, techniques are provided herein for managing page state and interaction between a client and server, wherein a developer is free to define any number of representations of a given resource. The techniques can be implemented, for example, using concepts defined in the Hypertext Transfer Protocol specification (e.g., HTTP specification 1.1) while maintaining compliance with the Representational State Transfer (REST) design model, to aid a given client-server arrangement in orchestrating communication therebetween. In accordance with one specific example embodiment, the client is configured (via a servable module or code that is executable in the client browser) to request the server to pass back a desired representation of requested content based on a template specified in the HTTP Accept request-header, and the server is only responsible for sending back the specifically requested content and in a rendition that corresponds to the template. JavaScript or other suitable code also provided in the corresponding webpage and executable in the client browser can be used to manage the server's response including placement of the provided content within the page at the appropriate location. The client request can be, for example, an HTTP Get or Post request. Based on the template specified in the HTTP Accept request-header, the requested content is rendered accordingly at the server if that specified template is available; otherwise, a default rendition of the content can be provided, in accordance with some embodiments. The HTTP Accept request-header may further specify a media type (e.g., HTML, JSON, etc) that is acceptable for the response, so as to provide a media type and template combination with which the requested content can be rendered. Thus, efficient selective client rendering can be achieved by specifying a rendering template in the Accept request-header associated with client-based requests such as Get and Post requests of the HTTP specification. Note, however, that the techniques provided herein need not be limited to the HTTP specification; rather, they can be applied to any other suitable application-level protocol for distributed hypermedia information systems, as will be appreciated in light of this disclosure.

By way of example, and with reference to a client-server system configured in accordance with an embodiment of the present invention, assume the server is programmed or otherwise configured to execute a dynamic web application and to serve one or more webpages in response to user content requests from the browser of the user's computer (the client). Each of the served webpages can have any number of components rendered on it, each renderable component of the page being associated with executable code generally referred to herein as a Request Module (e.g., JavaScript or other suitable client-side code) and a URL or other mechanism indicating the storage location of the component's content on the server. Further assume, for purposes of this example embodiment, that a given one of the pages is a topic-based comment page of a blogging or informational website covering a number of topics (e.g., woodworking, cooking, fiction writing, Internet-based communication protocols, etc). The topics may be related or share a common theme or subject matter (e.g., a product such as a newly released phone, or woodworking), or be effectively unrelated (e.g., an open forum that allows arbitrary posts or otherwise aggregates information on diverse topics). In such an example case, each general topic on the page for that particular topic can be one discrete component and include a selectable link. The page may further include a posting mechanism (or so-called composer), which can be another component. Thus, the user may initiate Get requests (e.g., select hyperlink of a given topic on the page) and Post requests (e.g., enter comment in text box and click post button) from the page.

When a given user uses the composer to post a new comment (e.g., via a text box or other suitable user input feature on the webpage) and selects the post function (e.g., via a mouse-clickable post-button adjacent the text box), the Request Module executable within the client browser is invoked. The Request Module reads the data provided via the composer form, serializes that data and executes an HTTP Post request to the URL associated with that component. The HTTP Post request has a body that is the data serialized from the form, and an Accept request-header. In accordance with one such specific example embodiment of the present invention, the Accept request-header specifies the desired template that should be used by the server to render the requested content for that page component. The Accept request-header may also specify a desired media type (e.g., JSON, HTML, etc). Thus, the Post request effectively asks the server to create some content and render the response with a specific template and media type combination. Continuing with the previous example use-case of a comment webpage, the server creates a new comment (the response to a Post request), and sends back the newly created comment rendered with the designated template (and specified or default media type). The Request Module that generated the HTTP Post request can be further configured to insert the returned content into the document object model (DOM), in accordance with an embodiment. As is known, a DOM is an application programming interface that generally defines the logical structure of a document (e.g., HTML and XML webpages/documents) and the way that document is accessed and manipulated. The DOM allows a website developer to build a webpage, navigate its structure, and add, modify, or delete elements and content.

Similar techniques can be used for other content requests, such as HTTP Get requests, as will be appreciated in light of this disclosure. For instance, for an HTTP Get request, the webpage developer is free to define any number of representations of a resource, by designating a desired template within the Accept request-header. In such cases, when a given user selects a component associated with a given topic or comment (e.g., via a hyperlink or other user-selectable component), the Request Module associated with that particular component and executable within the client browser is invoked. The Request Module executes an HTTP Get request to the URL associated with that component. Contained in the HTTP Get request is an Accept request-header that specifies the desired template that should be used by the server to render the requested content for that selected component. As previously explained, the Accept request-header may also specify a desired media type. Once the request is received at the server, the Accept request-header can be parsed to identify the desired template as well as a desired media type. If the desired template is available, then the requested content can be rendered in accordance with that template and the desired media type. If not, then a default rendition of the requested media type can be provided. Similarly, if no media type is specified, then a default type can be used.

As will be appreciated, the Accept request-header is part of the request headers indicated in the HTTP specification 1.1. By way of example, when a browser is requested to retrieve the web page associated with adobe.com, at least these characters are sent: GET http://www.adobe.com HTTP/1.0. However, additional information can also be sent, for example:

GET http://www.adobe.com HTTP/1.0
Cookie: userid:employee7@adobe.com;tmz:EST
User-Agent: Mozilla 5.0/Linux In this example, the Cookie and User-Agent string are generally known as request-headers. Accept is just another request-header, which is typically sent along with most requests a browser makes.

Note, however, that specifying a desired template within the Accept request-header for a given Get/Post or other such client-based request in accordance with an embodiment of the present invention is different than conventional techniques. In particular, conventional techniques don't use the Accept request-header in this fashion. Rather, the Accept request-header is generally used in two particular ways. One way is that the Accept request-header is interrogated to determine the media type (e.g., JSON, XML or HTML) of the response. The other way in which the Accept request-header is used is when the developer must request a different URL to the resource. For instance, Table 1 illustrates example paths that the Accept request-header can designate.

TABLE 1

| Example URLs to different resources |
| --- |
| /path/to/amazon/item.json |
| /path/to/amazon/item.html |
| /path/to/amazon/item.listitem.html |
| /path/to/amazon/item.reviews.html |

The last two entries of Table 1 show a format and a template (e.g., listitem or reviews) embedded in the URL, and the first entries only show a format (e.g., JSON or HTML). As previously explained, these paths are hard-coded at the server. Such techniques can become even more problematic, however, when a user attempts to alter the item with a Post request. This is because the HTTP specification 1.1 indicates that only intermediate caches that exactly match the URL must be invalidated. For instance, assume a user does a Post request to, for example, /path/to/amazon/item.json. If the user then subsequently does a Get request to retrieve that resource using, for example, /path/to/amazon/item.reviews.html, the response may return stale data, which would be undesirable. This is because there are multiple copies of the target resource (one copy per URL).

In accordance with an embodiment of the present invention, the same resource at a given storage location on the server can be accessed each time (using the same URL) and rendered according to any desired template specified in the Accept request-header and that is available at the server when the request is received and processed. Likewise, the format of the rendered content can be any desired hypermedia type, which can also be specified in the Accept request-header. In addition, note that any caches for all available hypermedia and template types can be invalidated after a post is processed, in accordance with an example embodiment of the present invention. Further note that the client need not create any HTML or JSON or other media type; rather, the client only modifies the page using the HTML or other desired media type generated by the server.

System Architecture

FIG. 1a illustrates a client-server system configured in accordance with an embodiment of the present invention. As can be seen, the system includes a dynamic web application executable on an application server and programmed or otherwise configured to interact with a client that is communicatively coupled to the application server via a network. The client includes a user computing system having a browser application that can be used to access the dynamic web application via the network, and to request content from and post content to a database accessible by the application server. The requested content may be provided in page form including any number of components, or a partial page such as one component of the page. As can be further seen, the dynamic web application includes a Post-Servlet Module (for processing Post requests and posting content to the database) and Get-Servlet Module (for processing Get requests and retrieving content from the database). In addition, pages served by the application server in response to requests from the client include one or more renderable components as well as instructions/code generally referred to herein as a Request Module that is executable in the client browser (e.g., JavaScript applet or other suitable code).

Such a client-server arrangement may be suitable, for example, for any online service (e.g., social networking, topical blogs or information source, cloud-based tools and applications, to name a few), or any other network-based system where it is desirable to allow a client to receive from a server selective content updates (or so-called partial page updates) for a given page rather than an entire refreshed page in response to client content requests. To this end, while the initial request for a given page may cause the entire page to be rendered in accordance with a full-page template, subsequent requests originating from that same page may cause a partial page update that can be processed using a template designated in the Accept request-header, which is specified in (or otherwise accessible to) the Request Module associated with the page component being updated.

The network can be any communications network, such as a user's local area network and/or the Internet, or any other public and/or private communication network (e.g., local and/or wide area network of a company, etc). The user's computing system (client) can be implemented with any suitable computing device, such as a laptop, desktop, tablet, smartphone, or other suitable computing device capable of accessing a server via a network and displaying content to a user. The browser application can be implemented using any number of known or proprietary browsers or comparable technology that facilitates retrieving, presenting, and traversing information resources on a network, such as the Internet, and which allows for the execution of page-embedded code such as the Request Module. The database can be, for example, a Java content repository (JCR) or any other suitable storage facility accessible to the server.

The Request Module operates in conjunction with the Post-Servlet Module and Get-Servlet Module to provide selective or partial page updating by using an Accept request-header template as variously described herein. As will be appreciated in light of this disclosure, the template is location-independent, in that it is not embedded in a URL or otherwise tied to a specific piece of content. In this way, the same piece of content can be rendered in accordance with any of the templates available at the application server, based on coding of the Request Module. Further details of the Request Module, Post-Servlet Module, and Get-Servlet Module will be provided in turn with reference to FIGS. 1b-c, 2a-c, 3, 4, and 5, each of which will be discussed in turn.

As will be appreciated in light of this disclosure, the various modules and components of the system shown in FIG. 1a, such as the Request Module, Post-Servlet Module, and Get-Servlet Module, can be implemented in software, such as a set of instructions (e.g. C, C++, object-oriented C, JavaScript, Java, BASIC, etc) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used. In one specific embodiment, the Request Module(s) are implemented with JavaScript or other downloadable code that can be provisioned in real-time to a client requesting access to a server, and the Post-Servlet and Get-Servlet Modules are implemented with Java or C++. Numerous other specific configurations can be used, as will be apparent.

Figure 1B:
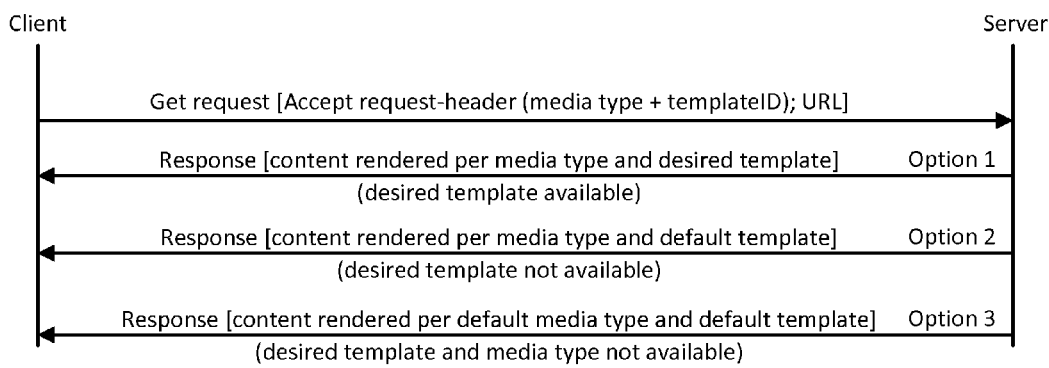
FIG. 1b illustrates an example request-response exchange of a client-server system, in accordance with an embodiment of the present invention.

FIG. 1b illustrates an example request-response exchange of a client-server system, such as the one shown in FIG. 1a, in accordance with an embodiment of the present invention. For purposes of discussion, assume an initial page request from the client has already been received by the server and that the server has responded by sending the requested page. Further assume that the requested page includes a number of renderable component(s) which the user can select.

Now, assume that the user wishes to retrieve content from the server by, for example, clicking a hyperlink or virtual button or otherwise selecting a component on the displayed page, which in turn invokes a Request Module embedded within the page and associated with that selected component. This client-side Request Module programmed to execute an HTTP Get request to the URL associated with that selected component. As can be seen in the top line of FIG. 1b, contained in the HTTP Get request generated by the Request Module is an Accept request-header that specifies a media type and a template ID. Any suitable hypermedia type can be specified, such as JSON or HTML. Alternatively, no media type need be specified, in which case a default media type can be used. Similarly, any desired rendering template can be specified. Alternatively, no template need be specified, in which case a default template can be used.

As can be further seen with reference to FIG. 1b, the server receives and processes the Get request, and issues a Response. The Response depends on a number of factors, including whether or not a template and/or media type are specified in the Get request as well as whether or not any template and/or media type that is specified in the Get request is available at the server. Three example responses are shown. The option 1 Response includes a body having the requested content rendered in accordance with the requested template and media type combination. The option 2 Response includes a body having the requested content rendered in accordance with a default template and the requested media type. The option 3 Response includes a body having the requested content rendered in accordance with a default template and media type combination. Another option might be, for instance, where the Response includes a body having the requested content rendered in accordance with the requested template and a default media type. In still other example cases, the system may be programmed or otherwise configured such that a Get request only specifies a desired template and the media type is hard-coded or otherwise selected by default at the server. Any number of alternatives can be used where a Get request has a rendering template specified in the Accept request-header such that the specified template is independent of the URL (or other content location/path) will be apparent in light of this disclosure.

Figure 1C:
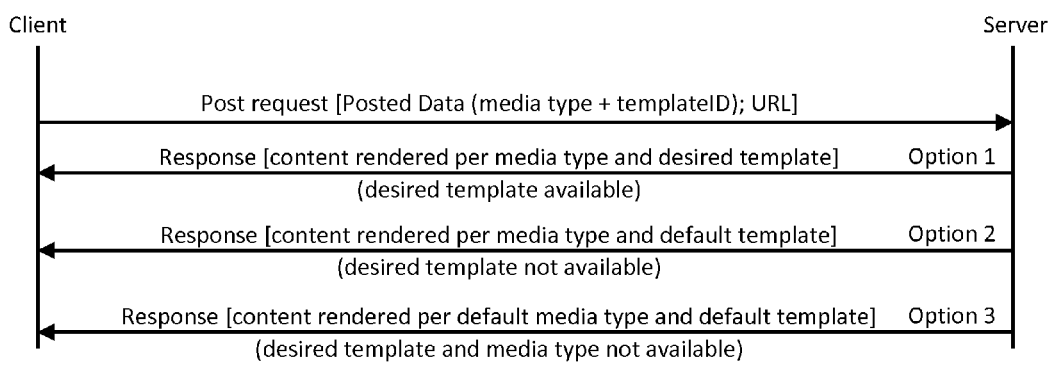
FIG. 1c illustrates an example request-response exchange of a client-server system, in accordance with another embodiment of the present invention.

FIG. 1c illustrates an example request-response exchange of a client-server system, such as the one shown in FIG. 1a, in accordance with another embodiment of the present invention. Just as with reference to FIG. 1b, assume an initial page request from the client has already been received by the server and that the server has responded by sending the requested page, and that the requested page includes a number of renderable component(s) which the user can select.

Now, assume that the user wishes to post a comment to the server by, for example, entering a comment in a text box and clicking a post button on the displayed page, which in turn invokes a Request Module embedded within the page and associated with that composer component (or associated with a particular comment on the page). Any suitable composer component can be used to allow such user comments. In any such cases, this client-side Request Module programmed to execute an HTTP Post request to the URL associated with that selected component/composer. As can be seen in the top line of FIG. 1c, contained in the HTTP Post request generated by the Request Module is an Accept request-header that specifies a media type (e.g., JSON, HTML, etc) and a template ID. Just as previously discussed with reference to FIG. 1b, if no media type and/or template is specified, then a default media type and/or template can be used.

As can be further seen with reference to FIG. 1c, the server receives and processes the Post request, and issues a Response. Just as with the response to a Get request, the Response depends on a number of factors, including whether or not a template and/or media type are specified in the Post request as well as whether or not any template and/or media type that is specified in the Post request is available at the server. Three example responses are shown, similar to those discussed with respect to the Post request, and that discussion is equally applicable here. In still other example cases, the system may be programmed or otherwise configured such that a Post request only specifies a desired template and the media type is hard-coded or otherwise selected by default at the server. Any number of alternatives can be used where a Post request has a rendering template specified in the Accept request-header such that the specified template is independent of the URL (or other content location/path) will be apparent in light of this disclosure.

Example Use-Cases

Figures 2A, 2B, 2C:
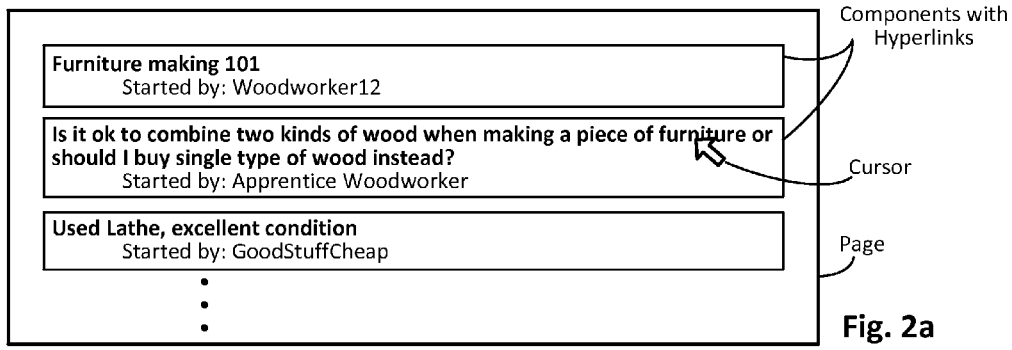
FIG. 2a illustrates an example page including a number of hyperlink components that can be selected and configured in accordance with an embodiment of the present invention.
FIG. 2b illustrates an example representation provided in response to a user selecting one of the components on the page shown in FIG. 2a, in accordance with an embodiment of the present invention.
FIG. 2c illustrates another example representation provided in response to a user selecting the same component selected in FIG. 2b, in accordance with an embodiment of the present invention.

FIG. 2a illustrates an example page including a number of hyperlink components that can be selected and configured in accordance with an embodiment of the present invention. This page can be, for example, the initial page served to the client computer in response to the initial access to a website of interest to the user. As can be seen, the page includes a number of components each having a hyperlink that can be selected by the user. The general theme of this example page happens to be woodworking. The components may be organized and presented on the page in any suitable fashion, such as by topic, alphabetically, time last accessed, etc. As can be further seen, the user is interested in the second component listed on the page, which in this example case has to do with whether or not it is ok to combine two types of wood when making a piece of furniture. The user moves the cursor of the component of interest and clicks or otherwise selects that component. In this particular example, the user can click a hyperlink of the target component.

Note that the components are broken up enough so that a page designer can request just a single topic if desired via a URL. In operation and in accordance with an example embodiment, and as previously explained, the selection of the hyperlink of the target component invokes a Request Module embedded in the page and associated with that component. The Request Module then executes a GET request to the designated URL and which includes an Accept request-header that designates a template and a media type, both of which can vary depending on how the developer would like the page to look. The server receives the Get request and processes it using the specified template and a media type combination when possible, and may further be configured to supplement the request with a default template and/or media type if necessary.

FIG. 2b illustrates an example representation provided by the server in response to a user selecting the target component on the page shown in FIG. 2a, in accordance with an embodiment of the present invention. For purposes of discussion, assume that the URL associated with the target component is: http://hostName/forumName/topicName, which is where the Get request is sent. Further assume the Accept request-header included in the Get request by the Request Module is: "Accept: text/html;template=fullsize-template" so as to designate media type of 'text/html' and a rendering template ID of 'fullsize-template' indicating a fullsize response is desired. In one such example case, the response from the server will appear as shown in FIG. 2b (Response #1 via Template A).

FIG. 2c illustrates another example representation provided by the server in response to a user selecting the same component selected in FIG. 2b, in accordance with an embodiment of the present invention. In particular, while doing a GET request to the same place (http://hostName/forumName/topicName) assume the Accept request-header included in the Get request by the Request Module is: "Accept: text/html;template=listitem-template" so as to designate media type of 'text/html' and a rendering template ID of 'listitem-template' indicating a response other than fullsize is desired. In one such example case, the response from the server will appear as shown in FIG. 2c (Response #2 via Template B).

Thus, the same resource from the server can be represented in two different ways, as shown in FIGS. 2b and 2c, respectively. So, a client can be specific about content requests by adding a "template=[templateName]" parameter to the "text/html" media type. Note that the server only sends the representation of the object and not the page the object is on. The client can assemble this snippet (HTML, or other format) on the page. A client can pass the template name in the Accept request-header to get the server to render that resource with that template, which effectively allows the caller to control the representation of the response generated by the server.

From these example use-cases, note that every component on a given page can be rendered in a standalone or modular fashion. Further note that a properly crafted URL can render a forum, a topic, or any other component into HTML or JSON or other suitable media type. This enables the client to change the page without refreshing the whole window (e.g., pagination) and creating new comments on a topic. Further note that a servlet that creates the content can be more aware of the super types of the object it is going to create. Further note that a user can create and update page data using the same URL so all the renderings will correctly invalidate. URLs for services or component rendering need not use selectors and/or extensions for rendering content.

As will be appreciated, the varying of the Accept header applies to all the HTTP verbs. With further reference to the example use-case where a user is writing a comment on a given topic, when a user presses the submit button, the Request Module provided by the page designer/developer only needs to do a Post request at the topic's URL with an Accept request-header of "Accept: text/html; template=listitem–template" and the server will respond with the newly created comment rendered based on the template requested by the client. So the only thing a Request Module needs to do at this point is insert it into the DOM, in accordance with an embodiment. The developer is free to request any template that is available on the server, which really allows the client-based code and the server-based code to operate independently, yet always use the same rendering technology.

As will be further appreciated in light of this disclosure, a template is where a designer/developer can readily change what the components looks like. All the business logic (e.g., logic that creates the resource or determines if the user is allowed to access the resource in question) can reside, for example, in the full-page default template (e.g., default.jsp) or in a servlet. In the case of Apache Sling, the server itself can composite the templates, just as the Request Module as variously described herein, which allows the application server to create composite renditions of many resources and templates. As described with reference to FIG. 2c, for instance, if a developer does not like the way the avatar is displayed, the developer can change just one template on the system and this change will be used both by the servlet and the client modules. Using the various techniques provided herein, upgrades are easier and the developer has much less to maintain because the Request Module and the Get or Post Servlet Module share the same template to render a resource.

As is known, Apache Sling is an open source web framework for the Java platform that allows for creating content-focused applications with a Java content repository (JCR) or other suitable content database. In particular, Apache Sling allows developers to deploy their application components as OSGi bundles ("Open Services Gateway initiative") or as scripts and templates in the content repository or database. Example scripting languages that can be used include JSP, server-side JavaScript, Ruby, and Velocity. Thus, Apache Sling can be used to expose content in a given content repository as HTTP resources, while also accommodating a RESTful style of application architecture. As is further known, OSGi framework is a service platform and module system for the Java programming language that implements a complete and dynamic component model, something that does not exist in standalone Java/virtual machine environments.

Methodology

Figure 3:
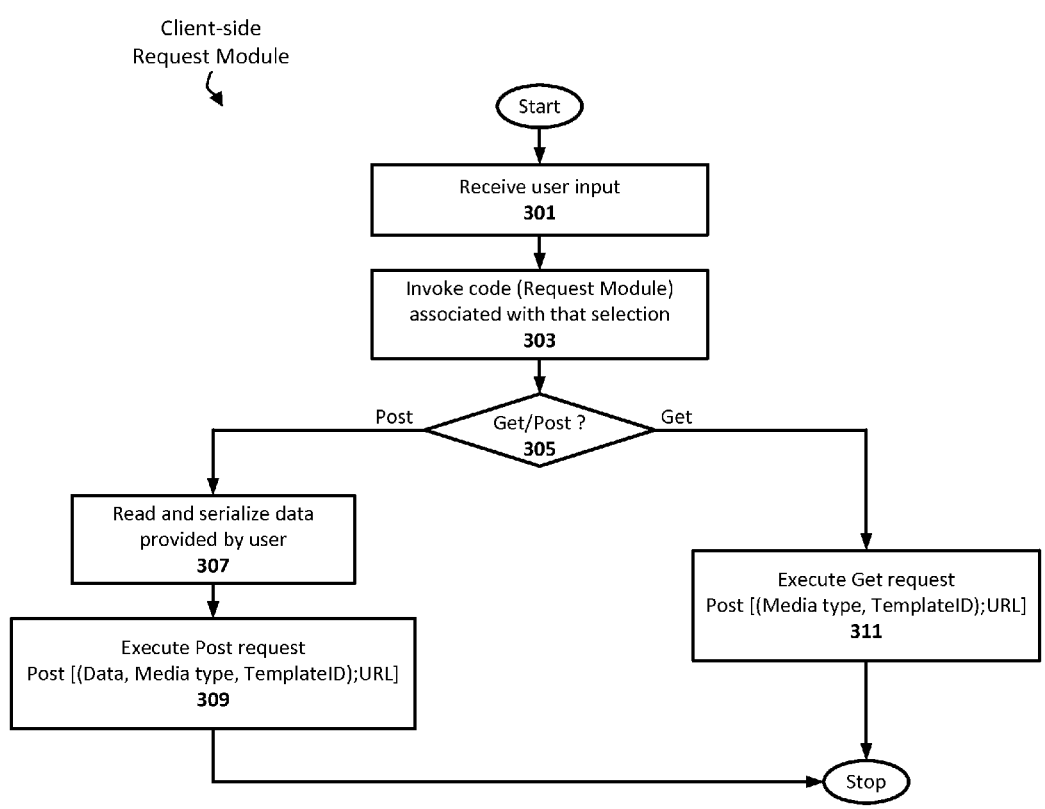
FIG. 3 illustrates a client-side methodology for processing a content request in accordance with an embodiment of the present invention.

FIG. 3 illustrates a client-side methodology for processing a content request in accordance with an embodiment of the present invention. As previously explained, this method can be carried out, for example, via a Request Module or other code embedded or otherwise executable within a browser for a given page served to a client. In accordance with one such embodiment, JavaScript or other suitable client-side code can be used to implement the methodology.

As can be seen, the method includes receiving 301 user input via, for example, a mouse click on a component displayed in a browser application. The method continues with invoking 303 code (Request Module) associated with that selection, and determining 305 if a Get or Post request has been provided. If a Post request, then the method continues with reading and serializing 307 data provided by user, and executing 309 a Post request, such as: Post [(Data, Media type, TemplateID);URL]. Note how the TemplateID is independent of the URL. On the other hand, if a Get request, then the method continues with executing 311 a Get request, such as: Get [(Media type, TemplateID);URL]. Again, note how the TemplateID is independent of the URL.

Figure 4:
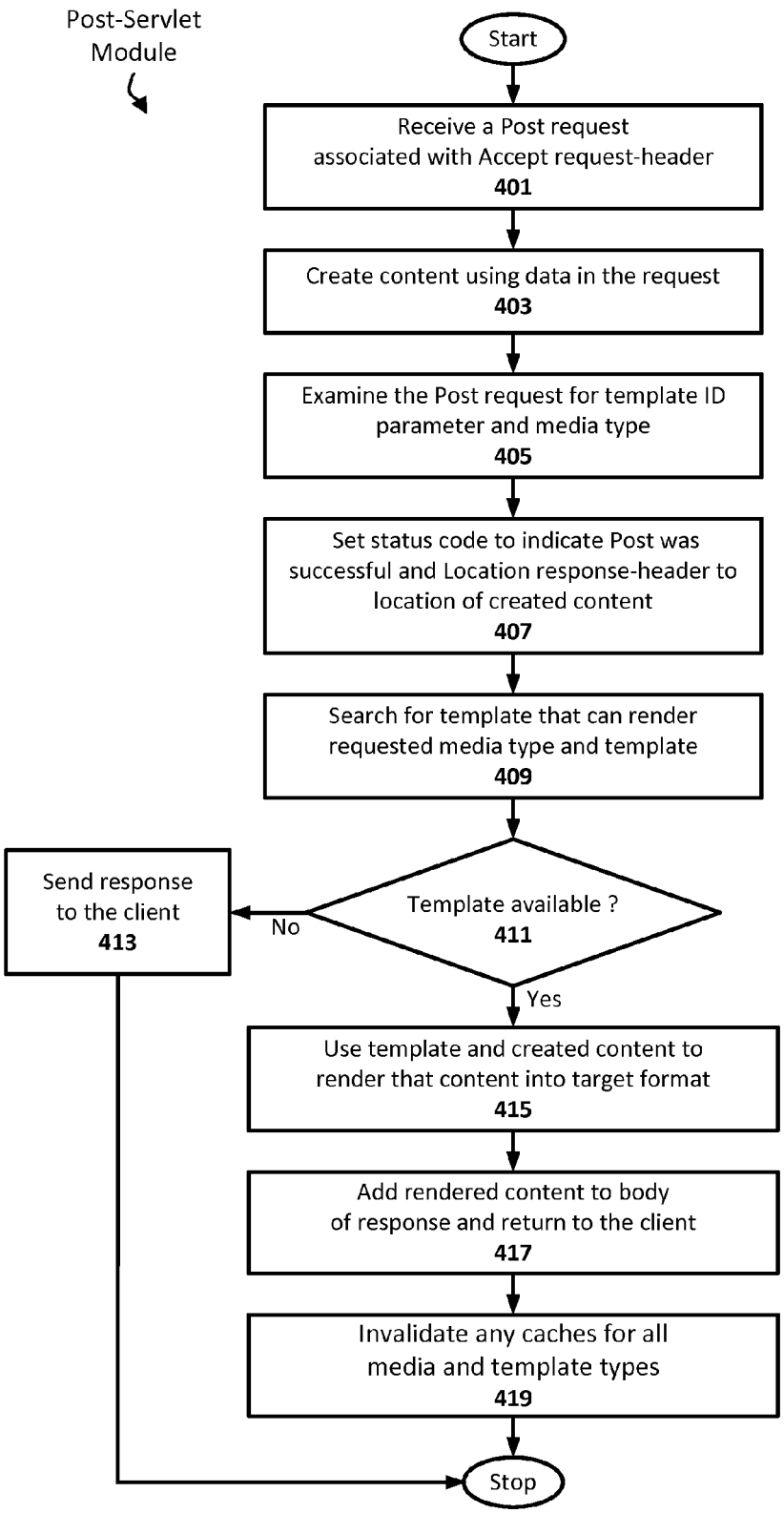
FIG. 4 illustrates a server-side methodology for processing a content request in accordance with an embodiment of the present invention.

FIG. 4 illustrates a server-side methodology for processing a Post request in accordance with an embodiment of the present invention. As can be seen, this method can be carried out, for example, via a Post-Servlet Module or other code executable at the server. In accordance with one such embodiment, Java or other suitable server-side code can be used to implement the methodology.

The method includes receiving 401 a Post request associated with an Accept request-header, and creating 403 content using data in the request. The method continues with examining 405 the Post request for a template ID parameter and media type. The method continues with setting 407 a status code to indicate the Post was successful and the Location response-header to the storage location of the created content. The Location header can be sent with an HTTP status code of 201, for example. The method continues with searching 409 for a template that can render requested hypermedia type and template ID combination. If it is determined at 411 that the template corresponding to the template ID is not available, then the method continues with sending 413 a response to the client, wherein default rendition can be used, as will be appreciated in light of this disclosure.

If it is determined at 411 that the template corresponding to the template ID is available, then the method continues with using 415 the template and created content to render that content into the target format, and adding 417 the rendered content to the body of the response and returning that response to the client. The method of this example embodiment further includes invalidating 419 any caches for all media and template types, to remove old or otherwise stale data.

Figure 5:
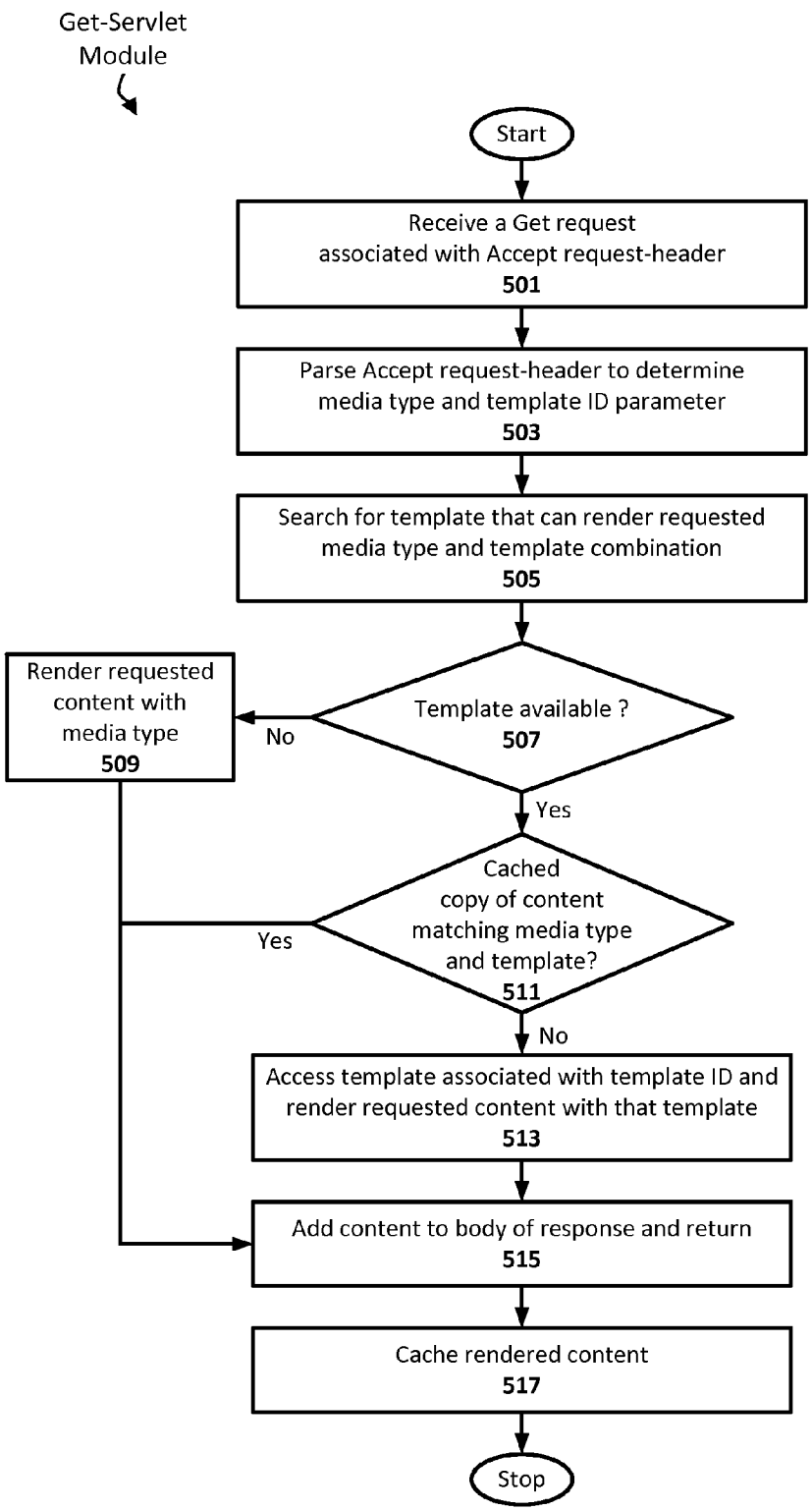
FIG. 5 illustrates a server-side methodology for processing a content request in accordance with another embodiment of the present invention.

FIG. 5 illustrates a server-side methodology for processing a Get request in accordance with another embodiment of the present invention. As can be seen, this method can be carried out, for example, via a Get-Servlet Module or other code executable at the server. In accordance with one such embodiment, Java or other suitable server-side code can be used to implement the methodology.

The method includes receiving 501 a Get request associated with an Accept request-header, and parsing 503 the Accept request-header to determine if there is a media type and template ID parameter specified for the request. The method continues with searching 505 for a template that can render requested media type and template combination. If it is determined at 507 that the template corresponding to the specified template ID is not available, then the method continues with rendering 509 the requested content with the specified media type, and adding 515 the rendered content to the body of the response and returning that response to the client. A default rendition can be used in such cases, as will be appreciated in light of this disclosure. In some embodiments, the method may further include placing a copy of the rendered content into the server cache, as shown at 517.

If it is determined at 507 that the template corresponding to the template ID is available, then the method continues with determining 511 if there is a cached copy of the content matching the media type and template on the server. If so, then the method continues with adding 515 the cached rendered content to the body of the response and returning that response to the client. On the other hand, if a cached copy of the content matching the media type and template is not on the server, then the method continues with accessing 513 the designated template and then rendering the requested content with that template. The method continues with adding 515 the rendered content to the body of the response and returning that response to the client. Again, in some embodiments, the method may further include caching 517 the rendered content (so that it will be available for future like-requests, as determined at 511).

Other specific implementations will be apparent in light of this disclosure. One such specific example case may be driven, for instance, by a client (such as shown in FIG. 1*a*) that wishes to paginate through the results provided by the component discussed with reference to FIG. 2*a*. In particular, after the page is rendered, the client may use the Request Module to request the next page of results. To do this, the Request Module issues a request for the resource with some extra parameters, (e.g., path/to/resource?start=10&count=10) to specify which next resources it wants. In that request, the Request Module adds an Accept request-header with a media-type of "text/html" and a template of "list-items". Using the Get Servlet Module the server looks up the requested list of resources and can follow the process of FIG. 5 to render each resource. The Servlet Module assembles the pieces of hypermedia and delivers them to the Client Module. In response to the user action, in this case pagination, the Client Module removes all the content in the page from FIG. 2*a* and replaces is it with the content sent from the Servlet Module it invoked. The client module is then able to do any other tasks necessary for the user action, in this particular example incrementing which page the user is currently seeing and indicating if more or fewer pages are available.

Numerous embodiments will be apparent, and features described herein can be combined in any number of configurations. One example embodiment of the present invention provides a non-transient computer program product encoded with instructions that when executed by one or more processors cause a process to be carried out. The process includes receiving, at a client computing system, user input that selects a component displayed on a page via a browser application executing on the client computing system. In response to the user input being associated with a content request, the process further includes executing an HTTP content request to a storage location on a server computing system with which the client computing system is communicatively coupled, the HTTP content request associated with an HTTP Accept request-header that designates a template that is independent of the storage location on the server computing system and can be used to render content that is responsive to the HTTP content request. In some cases, the HTTP content request is an HTTP Post request, and executing the Post request includes reading and serializing user-provided data and including that data with the Post request. In some cases, the HTTP content request is an HTTP Get request. In some cases, the Accept request-header further designates a media type. In some cases, the storage location on the server computing system is designated by a uniform resource locator (URL) associated with the selected component. In some cases, in response to the user input that selects the component, the process includes invoking a Request Module embedded within the page and associated with the selected component, the Request Module being executable within the browser and configured to execute the HTTP content request. Variations will be apparent. For instance, another embodiment provides a system configured to carry out the process as variously defined in this paragraph. Another example embodiment is a computer implemented methodology including the functionality of the process as variously defined in this paragraph.

Another embodiment of the present invention provides a non-transient computer program product encoded with instructions that when executed by one or more processors cause a process to be carried out. The process includes receiving, at a server computing system, an HTTP content request associated with an HTTP Accept request-header and a storage location on the server computing system, the HTTP Accept request-header designating a template that is independent of the storage location on the server computing system and can be used to render content that is responsive to the HTTP content request. The process further includes using the template to render content that is responsive to the HTTP content request, and returning, to a client computing system that issued the HTTP content request, a response that includes the rendered content that is responsive to the HTTP content request. In some cases, the HTTP content request is an HTTP Post request or an HTTP Get request. In one such case, the HTTP content request is an HTTP Post request and the process further includes at least one of: creating content using data included in the Post request, the created content being provide as input to the template used to render content that is responsive to the HTTP content request; setting a status code to indicate Post was successful; and setting an HTTP Location response-header to a storage location of created content. In some cases, the HTTP content request is an HTTP Get request. In some cases, the Accept request-header further designates a media type. In some cases, the storage location on the server computing system is designated by a uniform resource locator (URL) associated with the HTTP content request. In some cases, the template used to render content that is responsive to the HTTP content request must be located, and the process further includes examining the HTTP content request for a template ID parameter and media type, and searching for a template that can render the requested media type and template ID combination. In one such case, in response to determining that a template corresponding to the template ID is not available, the process further includes returning (to the client computing system that issued the HTTP content request) a response that includes a default rendition of the content that is responsive to the HTTP content request. In some cases, using the template to render content that is responsive to the HTTP content request further includes: in response to determining there is a cached copy on the server computing system of content corresponding to the template and a requested media type, returning to the client computing system the response with that cached rendered content; and in response to determining there is not a cached copy on the server computing system of content corresponding to the template and a requested media type, accessing the designated template and then rendering the content that is responsive to the HTTP content request with that template, and returning to the client computing system the response with that rendered content. Variations will be apparent. For instance, another example embodiment provides a system configured to carry out the process as variously defined in this paragraph. Another example embodiment is a computer implemented methodology including the functionality of the process as variously defined in this paragraph.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A non-transient computer program product encoded with instructions that when executed by one or more processors cause a process to be carried out, the process comprising:
   receiving, at a client computing system, user input that selects a component displayed on a page via a browser application executing on the client computing system, wherein the component defines a networked resource location on a server computing system;
   in response to receiving the user input, invoking a request module that forms part of the page;
   generating, by the client computing system, an HTTP content request that includes an HTTP Accept request-header, wherein the HTTP Accept request-header designates a template that is independent of the networked resource location, wherein the template is not identified in the component, and wherein the template defines how content returned in response to the HTTP content request is to be rendered, and wherein the HTTP Accept request-header that designates the template is selected by and generated by the client computing system prior to sending the HTTP content request to the server computing system; and
   sending, by the client computing system, the HTTP content request to the networked resource location on the server computing system with which the client computing system is communicatively coupled.

2. The computer program product of claim 1 wherein the HTTP content request is an HTTP Post request, and generating the HTTP Post request includes reading and serializing user-provided data and including the user-provided data with the HTTP Post request.

3. The computer program product of claim 1 wherein the HTTP content request is an HTTP Get request, and wherein the process further comprises:
   receiving, by the client computing system, content from the server computing system, wherein the received content is formatted by the server computing system in accordance with the template that is specified in the HTTP Accept request-header; and
   rendering, by the client computing system, the received content.

4. The computer program product of claim 1 wherein the Accept request-header further designates a media type.

5. The computer program product of claim 1 wherein the networked resource location on the server computing system is designated by a uniform resource locator (URL) associated with the selected component.

6. The computer program product of claim 1 wherein the request module executable within the browser application and is configured to generate the HTTP content request.

7. The computer program product of claim 1, wherein the component is a uniform resource locator.

8. A non-transient computer program product encoded with instructions that when executed by one or more processors cause a process to be carried out, the process comprising:
   receiving, at a server computing system from a client computing system, an HTTP content request that includes an HTTP Accept request-header and that indicates a storage location on the server computing system, the HTTP Accept request-header being selected by and generated by the client computing system prior to receiving the HTTP content request at the server computing system, the HTTP Accept request-header designating a template that is independent of the storage location on the server computing system and can be used to render content that is responsive to the HTTP content request;
   determining, by the server computing system, whether the server computing system hosts a cached copy of the content that is responsive to the HTTP content request and that is rendered in accordance with the template;
   in response to determining that the server computing system does not host the cached copy, (a) accessing, by the server computing system, the template, (b) using, by the server computing system, the template to render the content, and (c) returning, by the server computing system, a response that includes the rendered content to the client computing system; and
   in response to determining that the server computing system hosts the cached copy, returning, by the server computing system, a response that includes the cached copy to the client computing system.

9. The computer program product of claim 8 wherein the HTTP content request is an HTTP Post request, the process further comprising at least one of:
   creating the content using data included in the HTTP Post request, the data being provided as input to the template used to render content that is responsive to the HTTP content request;
   setting a status code to indicate the HTTP Post request was successful; and
   setting an HTTP Location response-header to the storage location of the created content.

10. The computer program product of claim 8 wherein the HTTP content request is an HTTP Get request.

11. The computer program product of claim 8 wherein the Accept request-header further designates a media type.

12. The computer program product of claim 8 wherein the storage location on the server computing system is designated by a uniform resource locator (URL) associated with the HTTP content request.

13. The computer program product of claim 8, the process further comprising:
   examining the HTTP content request for a template ID parameter and a media type; and
   searching for a stored template that (a) can render the media type and (b) is associated with the template ID parameter.

14. The computer program product of claim 8, wherein determining whether the server computing system hosts the cached copy of the content further comprises determining whether the server computing system hosts of content that is responsive to the HTTP content request, and that is rendered in accordance with the template and a media type identified in the HTTP content request.

15. A computer implemented methodology, comprising:
   receiving, at a server computing system, an HTTP content request that includes an HTTP Accept request-header and that indicates a storage location on the server computing system, the HTTP Accept request-header being selected by and generated by the client computing system prior to receiving the HTTP content request at the server computing system, the HTTP Accept request-header designating a template that is independent of the storage location on the server computing system and can be used to render content that is responsive to the HTTP content request;

using, by the server computing system, the template to render the content that is responsive to the HTTP content request; and returning, by the server computing system, a response that includes the rendered content that is responsive to the HTTP content request to a client computing system that issued the HTTP content request.

16. The method of claim 15 wherein the HTTP content request is one of an HTTP Post request or an HTTP Get request.

17. The method of claim 15 wherein the Accept request-header further designates a media type.

18. The method of claim 15 wherein the storage location on the server computing system is designated by a uniform resource locator (URL) associated with the HTTP content request.

19. The method of claim 15 further comprising:
examining the HTTP content request for a template ID parameter and a media type; and
searching for a stored template that can render the media type and that is associated with the template ID parameter.

20. The method of claim 15, wherein using the template to render the content that is responsive to the HTTP content request further comprises:
determining whether the server computing system hosts a cached copy of the content that is rendered in accordance with the template; and
in response to determining that the server computing system does not host the cached copy, using the template to render the content.

* * * * *